(12) United States Patent
Rodrigues et al.

(10) Patent No.: US 8,390,877 B2
(45) Date of Patent: Mar. 5, 2013

(54) EXPORTATION OF SCANNER'S INTERNAL IMAGE AUTO-SEGMENTATION

(75) Inventors: Rudolph A. Rodrigues, Rochester, NY (US); Ralph H. Huedepohl, Bloomfield, NY (US); Matthew A. Ippolito, Rochester, NY (US); Todd W. Glatz, Macedon, NY (US); Kenneth M. Cigna, Sr., Walworth, NY (US); David B. Baum, Ontario, NY (US); Gene M. Nitschke, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1220 days.

(21) Appl. No.: 11/802,837

(22) Filed: May 25, 2007

(65) Prior Publication Data

US 2008/0291507 A1    Nov. 27, 2008

(51) Int. Cl.
*H04N 1/00* (2006.01)
*H04N 1/04* (2006.01)
*G06F 3/12* (2006.01)
*G06K 9/34* (2006.01)

(52) U.S. Cl. .......... 358/1.6; 358/1.9; 358/1.15; 382/180
(58) Field of Classification Search .......... None
See application file for complete search history.

(56) References Cited

U.S. PATENT DOCUMENTS

| | | | |
|---|---|---|---|
| 5,339,172 A | 8/1994 | Robinson | |
| 5,765,029 A | 6/1998 | Schweid et al. | |
| 5,767,978 A | 6/1998 | Revankar et al. | |
| 6,240,205 B1 | 5/2001 | Fan et al. | |
| 6,249,592 B1 | 6/2001 | Fan et al. | |
| 6,469,805 B1 | 10/2002 | Behlock | |
| 6,496,277 B1 | 12/2002 | Chapin et al. | |
| 6,535,633 B1 | 3/2003 | Schweid et al. | |
| 6,650,439 B1 | 11/2003 | Nagarajan et al. | |
| 6,850,259 B1 | 2/2005 | Rzepkowski et al. | |
| 2003/0113035 A1* | 6/2003 | Cahill et al. | 382/284 |
| 2003/0152277 A1* | 8/2003 | Hall et al. | 382/229 |
| 2003/0206231 A1* | 11/2003 | Chen et al. | 348/207.99 |
| 2004/0001631 A1* | 1/2004 | Camara et al. | 382/224 |
| 2004/0042663 A1* | 3/2004 | Yamada | 382/217 |
| 2004/0258308 A1* | 12/2004 | Sadovsky et al. | 382/190 |
| 2005/0036694 A1 | 2/2005 | Li et al. | |
| 2005/0057670 A1* | 3/2005 | Tull et al. | 348/241 |
| 2005/0165848 A1* | 7/2005 | Kusama et al. | 707/104.1 |
| 2007/0014542 A1* | 1/2007 | Poulsen | 386/107 |
| 2007/0217678 A1* | 9/2007 | Kato | 382/180 |

OTHER PUBLICATIONS

Twain Specification, Version 1.9a, Jan. 21, 2001, http://www.twain.org/docs/TWAIN2d.pdf.

\* cited by examiner

*Primary Examiner* — Vincent Rudolph
(74) *Attorney, Agent, or Firm* — Pillsbury Winthrop Shaw Pittman, LLP

(57) ABSTRACT

A method and system are disclosed for exporting metadata from an image capture device, for example a scanner, preferably using a standard application programming interface. The metadata may be associated with a pixel, a page, or a region/object of the image, and could be used by an application, for example, to improve the quality of the image when printed or to facilitate the conversion from a single layer of image information to multi-mask mixed raster content (MRC).

21 Claims, 4 Drawing Sheets ern End) to a printer.
EXPORTATION OF SCANNER'S INTERNAL IMAGE AUTO-SEGMENTATION

FIELD

This application relates to a method and system for exporting metadata from an image capture device.

BACKGROUND

In the operation of a copier or printer, particularly color machines, it is highly desirable to have means for variably processing and enhancing text, graphical and pictorial image quality. A typical workflow in a production publishing environment involves the following steps: scanning the hardcopy originals, outputting the scanned image data, and printing the image data through a DFE (Digital Front End) to a printer. The quality of the printed images is limited to the standard processing features and capabilities of the DFE. Particularly, in the case of single or multi-pass color printers, it is highly desirable that an image processing system be employed to reduce imaging problems caused by rendering systems which may not be well suited to each type of image.

Auto-segmentation techniques are known which can select the most appropriate method to render the various object types, (e.g., black and white or color images, text, etc.) present in an image. Such techniques permit an image to be divided into segments, which correspond to structural aspects of the image, and may be used to distinguish various objects of interest within the entire image on a page, and allow different printing properties or methods to be applied to the different document image segments by the DFE.

Specified regions of an image page are separated into classes, such as the typical text, graphics and pictures. Scanned or computer generated electronic document images may be rendered according to various colorization, contrast and/or halftoning techniques, for example. Some rendering techniques are more suitable for printing text regions, while others are more suitable for printing graphics or picture (bitmap) regions. The quality of the printed image can be efficiently improved by first separating all the regions in a document image that need to be evaluated for differential rendering, and then classifying these regions according to the desired rendering techniques. Automatic processing of document images is performed by classifying various regions in a document image into logically separate classes. These classes may be text, graphics and pictures. The image segmentation stage separates an input image into regions or objects. Output of the segmentation stage contains region labels at each pixel in the input image.

Currently, auto-segmentation software applications, for example, ELAN ELP™ from ELAN GMK, are only capable of adding index information (or metadata) after the image data has been exported from a scanner and saved to file.

The inventors have recognized that, if the DFE processing step had more information about each pixel in the image, then more intelligent processing could be applied to improve the overall quality of the output image. The Xerox® FreeFlow Scanner 665™ scanner, for example, produces per pixel information for its own internal use when processing images inside the scanner's hardware/firmware image processing path (e.g., in Automatic Mode). However, this information is presently not exported from the scanner.

Thus, the inventors have recognized that it would be desirable to export metadata associated with the image data from the image capture device to enable more intelligent post-scan processing of the images.

SUMMARY

In a first embodiment, a method for exporting image metadata from an image capture device is provided, comprising: generating electronic image data comprising a plurality of pixels representative of an image using the image capture device; generating metadata associated with the image data, the metadata representing a characteristic of an associated division of the image; and exporting the image data and the metadata from the image capture device.

The metadata may preferable comprise: pixel-by-pixel metadata, page-by-page metadata, or object-by-object metadata, or a combination thereof. Similarly, the division of the image may comprise: a pixel, a page, a region, an object, or a combination thereof.

The metadata may be embedded or linked with the image data, for example, in an image file capable of accepting metadata.

The image capture device may be selected from the group consisting of: scanner, a digital copier, a facsimile machine, a multi-function device, a digital still camera, and a digital video camera.

The image data including the metadata associated with the image data may be exported from the image capture device through an interface, for example, an application programming interface, preferably selected from the group consisting of TWAIN, SANE, ISIS, and WIA.

The metadata may be generated from a segmentor and/or an auto-segmenting windowing technique, preferably a two-pass auto-segmenting windowing technique.

In a second embodiment, a system for exporting image metadata from an image capture device is provided, comprising: an image capture device for generating electronic image data comprising a plurality of pixels representative of an image; a processor configured to generate metadata associated with the image data, the metadata representing a characteristic of an associated division of the image; and an interface coupled to the processor for exporting the data image and the metadata from the image capture device.

Other objects, features, and advantages of one or more embodiments of the present invention will seem apparent from the following detailed description, and accompanying drawings, and the appended claims.

BRIEF DESCRIPTION OF THE DRAWINGS

Embodiments of the present invention will now be disclosed, by way of example only, with reference to the accompanying schematic drawings in which corresponding reference symbols indicate corresponding parts, in which.

DETAILED DESCRIPTION

An embodiment of the invention proposes to export metadata ("TAG data") from an image capture device. In a preferred embodiment, the metadata is pixel-by-pixel tags. However, it is understood that the TAG data may also be object-by-object metadata or page-by-page metadata, or a combination thereof. The TAG data could be used by an application, for example, to improve the quality of the image when printed or to facilitate the conversion from a single layer of image information to multi-mask mixed raster content (MRC).

The disclosed embodiment is part software and part in the imaging device's hardware and software. It uses mechanisms allowed via a standard application programming interface (API) to enable setup of the imaging device's hardware/firmware for exportation of image segmentation TAG data which are normally not exported from the scanner.

Figure 1:
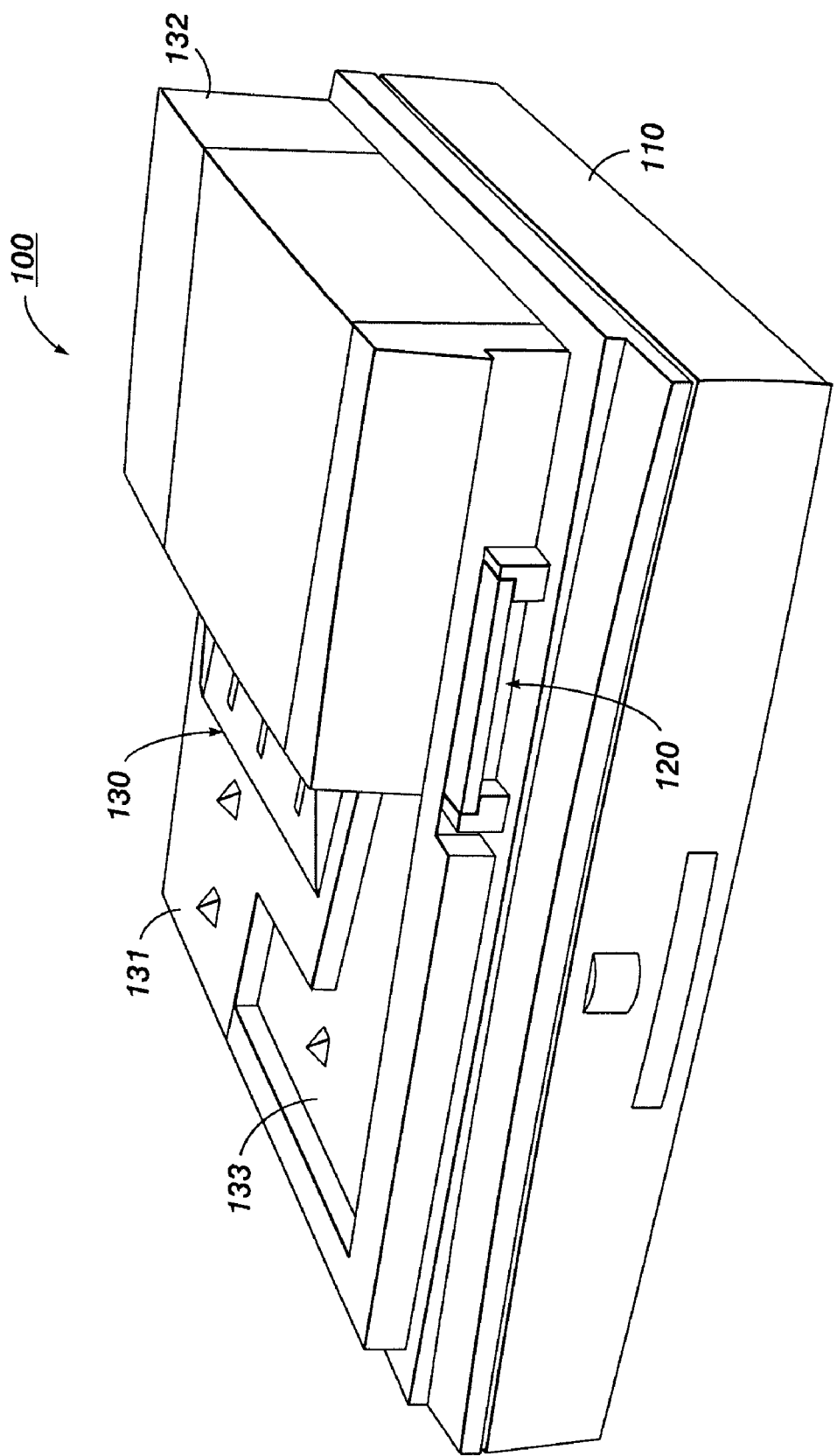
FIG. 1 is a perspective drawing of an exemplary image capture device, in accordance with an embodiment of the present invention.

FIG. 1 illustrates an exemplary embodiment of an electronic image capture device 100. Preferably, the image capture device 100 maybe be a digital scanner (as shown in FIG. 1); however, the invention is not necessarily limited to a scanner, and may be performed with an electronic image data generating device, or the like, and, regardless of the name, can be any one of a scanner, a digital copier, a facsimile machine, a multi-function device, a digital still camera, a digital video camera, or any other known or later device that is capable of capturing an image and generating electronic image data representative of the image.

The electronic image capture device 100 includes a control panel 110, a document platen 120 on which an original document can be placed to generate corresponding electronic image data and a document handler 130. In particular, the document handler 130 includes a feed tray 131 on which the original document can be placed and a document feeder 132 which moves each document in turn from the feed tray 131 and feeds the removed document to the document platen 120. Each document is then returned to an output tray 133 after electronic image data is generated from that original document. This is just one example of a construction for the device 100 and is not intended to be limiting.

Typical scanning produces image data file, for example, using the TIFF file format for productivity reasons. The TAG data may be embedded and/or linked to the image data in the image file, similar to how the International Color Consortium (ICC) profile mechanism is used for color management of scanned images.

By providing TAG data, in addition to the image data, the image quality may be advantageously improved. For example, the TAG data may enable more than just color fidelity, and may impact many other image quality metrics such as text and line quality, moire, background content, etc. Further, the TAG data allows extraction of hardware generated image segmentation data normally not available to the DFE for future (post-scan) use.

TAG data is preferably generated inside the image capture device. For example, the Xerox® FreeFlow Scanner 665™ scanner produces TAG data for its own internal use when processing images inside the scanner's hardware/firmware image processing path (e.g., in Automatic Mode). Various aspects of the Xerox® FreeFlow Scanner 665™ scanner are disclosed, for example, in U.S. Pat. Nos. 6,496,277; and 5,765,029, herein incorporated by reference. It is understood, however, that other image capture devices could be modified to perform a similar function.

In one embodiment, an imaging device is connected to a digital front end (DFE) of a color printer. The DFE is a device used to manage print devices especially in high-volume environments, e.g., color laser printers, production printers, and digital presses. The DFE increases productivity by efficiently automating digital workflow. Typically, the DFE is an external device, such as a computer or server, that interfaces to a network and typically will accept image data and process the image data for a copier or printer devices. However, the DFE could be a part of the printing device itself. For example, the Xerox® iGen3™ digital printing press incorporates a DFE. By having knowledge of each pixel individually, the DFE can process each pixel of the image data more intelligently.

In a preferred embodiment, the TWAIN™ ("TWAIN") standard application programming interface is utilized to export TAG data from the image capture device. TWAIN is an open public scanning interface for Microsoft Windows and Apple Macintosh operating systems developed by a coalition of imaging hardware and software manufacturers. TWAIN is defined by the TWAIN Specification; the latest version 1.9 was ratified by the TWAIN Working Group Committee as of Jan. 20, 2001, and is available at http://www.twain.org/docs/TWAIN2d.pdf, herein incorporated by reference. Since the TWAIN architecture is known it will only be briefly discussed herein. The three key elements in TWAIN are the application software; the data source manager software; and the data source software. The application software are applications which are specifically modified for using TWAIN. The Data Source Manager software manages the interactions between the application and the Source. This code is provided in the TWAIN Developer's Toolkit and is shipped with each TWAIN application and Source. The Source software controls the image acquisition device and is written by the device developer to comply with TWAIN specifications.

It is also understood that other proprietary application programming interfaces could similarly be used, for example, Scanner Access Now Easy (SANE) for UNIX (including GNU/Linux); Image and Scanner Interface Specification (ISIS) from EMC Captive (formerly Pixel Translations); and Windows Image Acquisition (WIA) from Microsoft.

Figure 2:
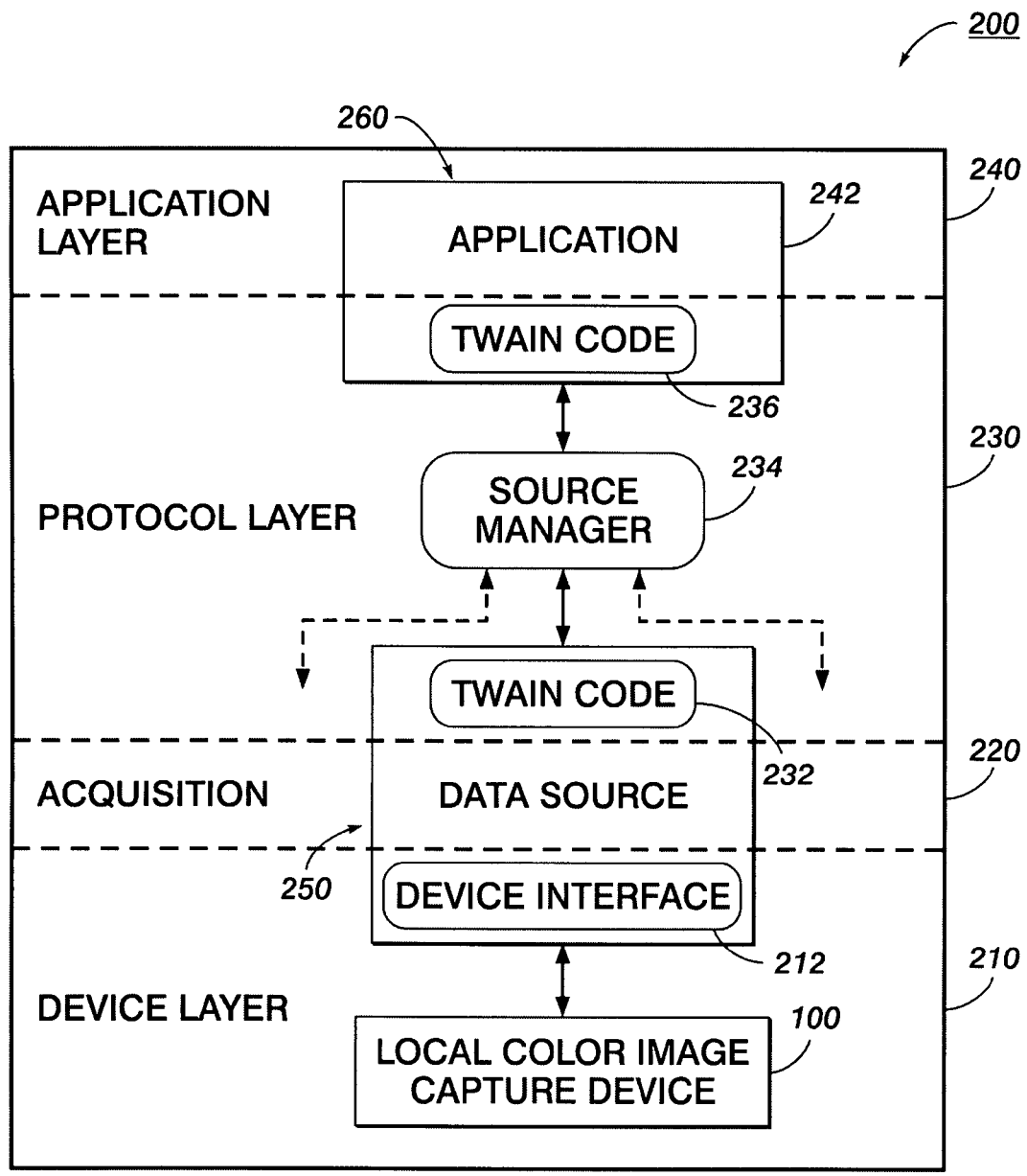
FIG. 2 shows a diagram illustrating the structural organization of an image capture device control system using TWAIN, in accordance with an embodiment of the present invention.

FIG. 2 shows a diagram illustrating an exemplary embodiment of the structural organization of an image capture device control system 200 using TWAIN. The image capture device control system 200 includes a device layer 210, an acquisition layer 220, a protocol layer 230, and an application layer 240. In particular, the device layer 210 includes the image capture device 100, such as a Xerox® FreeFlow Scanner 665™ color scanner or any of the other electronic image data capture devices indicated above. The device layer 210 also includes a device interface portion 212 of a TWAIN driver, or TWAIN data source (DS) 250. In particular, as shown in FIG. 2, the TWAIN driver (or data source) 250 bridges the device layer 210, the acquisition layer 220 and the protocol layer 230.

The protocol layer 230 includes a TWAIN code portion 232 of the TWAIN driver (or data source) 250, a source manager 234 and a TWAIN code portion 236 of a TWAIN-compliant application 260. The application layer 240 includes the application portion 242 of the application 260.

As shown in FIG. 2, control and data signals are provided from the electronic image data capture device 100 to the TWAIN driver or data source 250 through the device interface portion 212 of the TWAIN data source 250. Similarly, control and data signals are provided between the TWAIN data source 250 and the source manager through the TWAIN code portion 232 of the TWAIN data source 250. The control and/or data signals are also provided between the source manager 234 and the application 260 through the TWAIN code portion 236. In various exemplary embodiments, the TWAIN data source 250 controls the electronic image data capture device 100. In various ones of these exemplary embodiments, the TWAIN data source 250 is developed by the manufacturer of the electronic image data capture device 100.

The source manager 234 manages and facilitates the interactions between the application 260 and the TWAIN data source 250. In various exemplary embodiments, one or more of two distinct source managers 234 have been implemented. Both are compiled as dynamic loading library modules. In general, dynamic load library modules are provided as part of the TWAIN developers tool kit and are shipped with each TWAIN compliant application and at each TWAIN-compliant electronic image data generating device. Further reference is made to U.S. Pat. No. 6,850,259 regarding the TWAIN interface for an image capture device, herein incorporated by reference.

Figure 3:
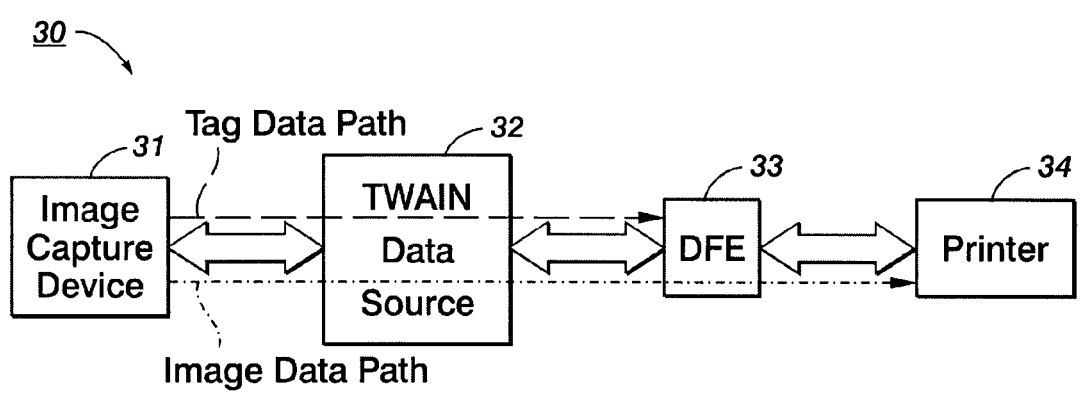
FIG. 3 is a diagram illustrating the exportation of electronic image data and TAG data from an image capture device, in accordance with an embodiment of the present invention.

FIG. 3 illustrate an exemplary embodiment 30 of the invention for exporting TAG data from an image capture device 31 to the printer 34 in a publishing or printing system. An image capture device 31 is provided, which may be configured to produce electronic image data of a document. The TWAIN Data Source 32 may associate the TAG data with each image in one of several different ways. For example, the data could be inserted as a subimage into the image file (e.g., a TIFF file) or it could be stored as a separate file (to be known as a TAG File) with a link to the TAG file stored within the TIFF file. Alternatively, the TWAIN standard operation 'DAT_EXTIMAGEINFO' triplet may be used to obtain the filename of the TAG file, and to transfer image data via memory instead of a TIFF file.

A calling application instructs the TWAIN Data Source 32 of the image capture device 31 to enable TAG data. The TWAIN Data Source 32 instructs the image capture device 31 to enable external access to TAG data. For example, the ICAP_EXTIMAGEINFO capability of TWAIN may be used to return the tag raster image to the application. An exemplary TWAIN call is as follows:

```
typedef struct {
    TW_UINT32 NumInfos;
    TW_INFO Info[1];
} TW_EXTIMAGEINFO, FAR * pTW_EXTIMAGEINFO;
```

The tag raster image will be stored in a TW_EXTIMAGE structure. The NumInfos member is set to 1, and TWAIN will allocate memory for the tag image, copy the tag image into that memory and store the memory handle in the Info member.

TWAIN allows the use of custom capabilities for controlling an image acquisition device. Using the custom TWAIN capability enables and manages exportation of TAGS from the scanner. Since preferably images are scanned to TIFF files for productivity reasons, the TAG data may be embedded and/or linked to the image data, similar to the ICC profile mechanism used for color management of scanned images.

There are two modes that TWAIN transfers images to the application: File and Memory. In file transfer mode TWAIN creates a file for each image. Preferably, TIFF files are used because TIFF files allow information to be embedded and/or linked to the image data. However, other image file types capable of accepting metadata may also be used. In memory transfer mode TWAIN allocates memory for the image and copies the image data into the memory. A handle or link to the memory is passed to the application.

The TAG data for each raster image would be stored in a separate raster image that consists of tag values instead of pixel values. Each "pixel" in the tag image describes a characteristic of the corresponding pixel in the actual image. The number of bits per pixel needed for each TAG depends on the amount of information encoded in each tag. Each pixel's tag information may be stored in memory, for example, in eight bits (one byte). Some of the TAG data classifications may include, but are not necessarily limited to: Neutral pixel; Text & Line Art; Low Frequency Halftone; High Frequency Halftone; Background pixel; and Window ID. This TAG image, for example, may have the same size and structure as a 8 bit per pixel grayscale image. The bits of each byte may be used like this:

Bits 0 . . . 2 Image Content binary coded as:
    1=Neutral pixel.
    2=Text & Line Art.
    3=Low Frequency Halftone.
    4=High Frequency Halftone.
    5=Background pixel.
Bits 3 . . . 7 may be binary coded as a Window ID number 0 . . . 31

The same tag image may be transferred in either file or memory transfer mode. In file transfer mode, preferably using a TIFF file, the tag image may be included in the TIFF file as a sub image. A TIFF sub-image is an alternate representation of the primary image. Alternately, TWAIN may create a separate tag image file. The separate file could also be linked to the primary image file by file name that is stored in the primary TIFF file in a private tag.

Next, the TWAIN Data Source 32 embeds and/or links the TAG data to image data. The TWAIN Data Source 32 hands off the image data and the associated TAG data to the DFE 33.

The DFE 33 may processes the TAG data file for printing. In an exemplary embodiment, if the DFE 33 knows that a part of the image is neutral text (i.e., black text from the TAG data), it could render that part of the image using Thresholding and black toner rather then using halftone screening and color toner as are conventionally performed.

In other embodiments (not shown), the TAG data may be passed through the DFE 33 directly to the print engine 34 or it may be sent to the print engine directly (if no DFE is involved as in a networked office device). All of this depends on the architecture of the printer and/or DFE.

The TWAIN Data Source 32 instructs image capture device 31 to scan the document and return the electronic representation of the image to the DFE 33. In addition, the TWAIN Data Source 32 instructs image capture device 31 to return the TAG data to the DFE 33. Lastly, the printer 34 prints the image.

Figure 4:
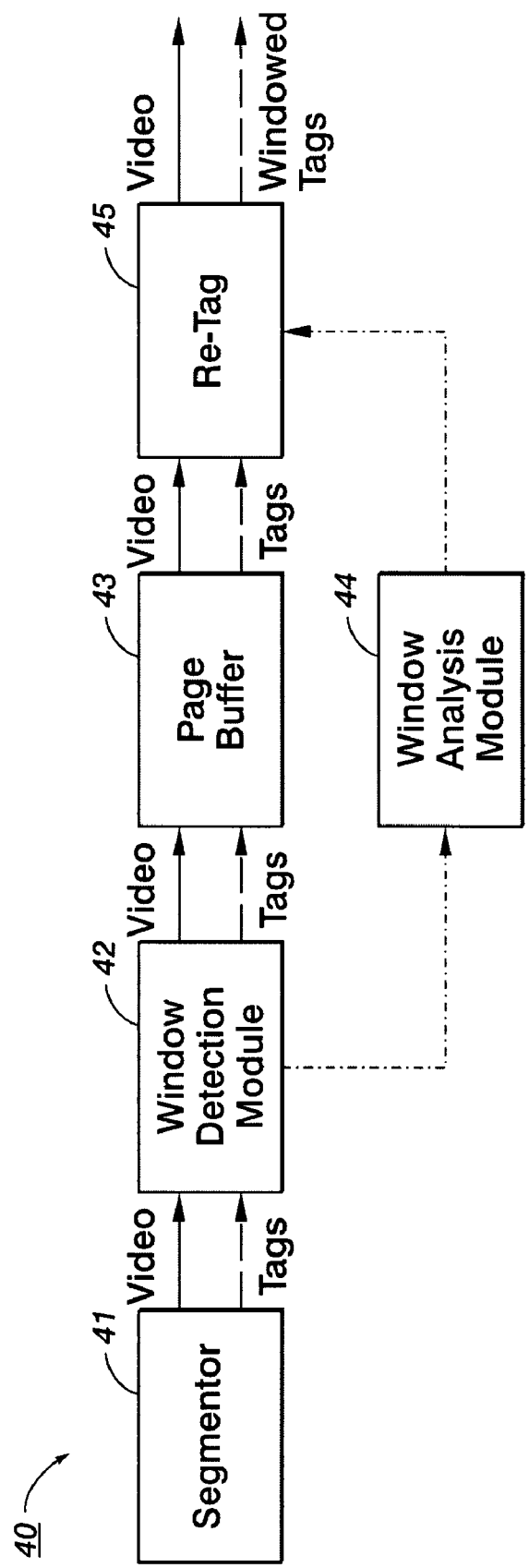
FIG. 4 is a diagram illustrating a system for generating TAG data within the image capture device, in accordance with an embodiment of the present invention.

FIG. 4 shows a two-pass "auto-segmentation" technique 40 for generating TAG data. It is noted that this is not the only possible method for developing TAG data and other forms of classification may also be used. The image processing may reside on a circuit board, e.g., an image processing board, within the image capture device. In this case, the images could be passed from the actual image capture mechanism directly to this image processing board (where tags are generated) or into a computer memory for later processing through the image processing board.

Each video pixel's class is a function of several local features. TAG data may be originally generated by the segmentor 41. The segmentor 41 looks at several scanlines of data and determines the content of a specific pixel based on surrounding pixels. This is significant, because it means that pixels are classified on an individual basis. Thus, segmentation will not create rectangular artifacts, which are common in algorithms where pixels are classified on a block basis.

A problem, however, is that some pixels may be misclassified. For example, some pixels within an image may be misclassified as text. To correct this situation, a segmentation tag cleanup process may be advantageously employed. See also U.S. Pat. No. 6,240,205, herein incorporated by reference. The clean-up identifies windows within the image and reclassifies all pixels within that region to the predominate tags (microclassifiers).

This two-pass auto-segmentation detects irregularly-shaped windows of any size so that every pixel in the detected window can be uniformly classified based on the predominate segmentation tags in that window, and rendered appropriately. This is useful because not every pixel in a halftone, for example, will be classified identically by the segmentor 41. The resulting halftone will look much better if every pixel in it is rendered the same.

During the first pass, the Window Detection Module 42 analyses the video and tag stream, generated by the segmentor 41, and detects Raw Windows as minimum low-level window requirements are met. Most of these Raw Windows are discarded, leaving only high probability Candidate Windows. Tag statistics are collected for pixels within those Candidate Windows.

The video and tags flow into a full page buffer 43 during the first pass, enabling start of the second pass to be delayed until the first pass has completed and the Window Analysis Module 44 has completed development of the Final Windows.

After the first pass has completed, but before the second pass can begin, the Window Analysis software analyzes the Window Candidate data to develop the Final Windows. The statistics for these windows are then analyzed to determine the appropriate final classification for each window.

During the second pass, the Re-Tagging module 45 is driven on a pixel-by-pixel basis by the same Raw Window IDs that were generated within the first pass Window Detection module.

The Inter-Pass process develops a Final Window ID Equivalence Table, which the Re-Tag module uses to tag each pixel according to three possible cases:

1.) Re-Tag with the Final Window ID if the pixel's containing Candidate Window is part of a Final Window;

2.) Leave the pixel's first-pass pixel-level classification tag if it was not part of a Final Window, even though it may have been part of a Raw or Candidate Window; or 3.) Leave the pixel's first-pass pixel-level classification tag if the pixel is not part of any window.

This Re-Tagging takes place as the video is streamed out of the page buffer, through Re-Tagging and downstream through the second-pass image processing and rendering pipelines.

Some of the possible pixel classifications for TAG data might include: 1.) Neutral pixel; 2) Text and Line Art; 3) Low Frequency Halftone; 4) High Frequency Halftone; 5) Background pixel; and 6) Window ID.

During image processing, external to the image capture device, the TAG data may be utilized to adjust an image processing operation, for example by the DFE, in the following manner:

1) for a Neutral pixel—rendering and printing image using black toner only;

2) for Text and Line Art—improving text and line quality by rendering the image via 'Thresholding' (instead of conventional half-toning);

3) for Low Frequency Halftone—reducing moire via de-screening;

4) for High Frequency Halftone—reducing moire via de-screening;

5) for Background pixel—eliminating background (i.e. due to colored paper originals) effect in prints; and 6) Identifying regions of common classifications (Pictures).

In other embodiments, the TAG data may also be, or may further be augmented by, object-by-object and/or page-by-page metadata. For example, the TAG data may be used to facilitate the conversion from a single layer of image information to multi-mask mixed raster content (MRC). In a MRC type export, a mask is used to determine one region or object (or window) type from another (photo, text, and halftone). This mask could be on a pixel-by-pixel basis or use region or object (window) coordinates. Only one tag (or Hint) is then needed to describe each individual region or object (window) type within the mask (window 1 is text, window 2 is photo, etc.).

The following advantages have been recognized over the conventional production printing and publishing. For example, exporting TAG data from the imaging device allows preservation of device independence for (scanned) images while enabling the ability to improve the image quality for any intended device. Further, it allows extraction of hardware generated image segmentation data normally not available external to the scanner for future (post-scan) use.

While the specific embodiments of the present invention have been described above, it will be appreciated that the invention may be practiced otherwise than described. The description is not intended to limit the invention.

What is claimed is:

1. A method for exporting image metadata from an image capture device, comprising:

generating electronic image data comprising a plurality of pixels representative of an image using the image capture device;

generating metadata associated with the image data, the metadata representing a characteristic of an associated division of the image; and exporting the image data and the metadata from the image capture device;

wherein the metadata comprises pixel-by-pixel metadata;

wherein the pixel-by-pixel metadata comprise tag values corresponding to and describing a characteristic of each of the plurality of pixels.

2. The method of claim 1, wherein the division of the image comprises: a pixel, a page, a region, an object, or a combination thereof.

3. The method of claim 1, further comprising embedding or linking the metadata with the image data.

4. The method of claim 1, wherein the image capture device is selected from the group consisting of: scanner, a digital copier, a facsimile machine, a multi-function device, a digital still camera, and a digital video camera.

5. The method of claim 1, wherein the electronic image data is an image file capable of accepting metadata.

6. The method of claim 1, wherein exporting the image data including the metadata from the image capture device is through an interface.

7. The method of claim 6, wherein the interface is an application programming interface.

8. The method of claim 7, wherein the application programming interface is selected from the group consisting of TWAIN, SANE, ISIS, and WIA.

9. The method of claim 1, wherein the metadata is generated from a segmentor.

10. The method of claim 9, wherein the metadata is generated from a two-pass auto-segmenting windowing technique.

11. The method of claim 1, wherein the pixel-by-pixel metadata comprise metadata associated with individual pixels of the image data.

12. A system for exporting image metadata from an image capture device, comprising:

an image capture device for generating electronic image data comprising a plurality of pixels representative of an image;

a processor configured to generate metadata associated with the image data, the metadata representing a characteristic of an associated division of the image; and an interface coupled to the processor for exporting the data image and the metadata from the image capture device;

wherein the metadata comprises pixel-by-pixel metadata;

wherein the pixel-by-pixel metadata comprise tag values corresponding to and describing a characteristic of each of the plurality of pixels.

13. The system of claim 12, wherein the division of the image comprises: a pixel, a page, a region, an object, or a combination thereof.

14. The system of claim 12, wherein the processor is configured to embed or link the metadata with the image data.

15. The system of claim 12, wherein the image capture device is selected from the group consisting of: scanner, a digital copier, a facsimile machine, a multi-function device, a digital still camera, and a digital video camera.

16. The system of claim 12, wherein the electronic image data is an image file capable of accepting metadata.

17. The system of claim 12, wherein the interface is an application programming interface.

18. The system of claim 17, wherein the application programming interface is selected from the group consisting of TWAIN, SANE, ISIS, and WIA.

19. The system of claim 12, further comprising a segmentor configured to generate the metadata.

20. The system of claim 12, further comprising a processor configured to perform a two-pass auto-segmenting windowing technique.

21. The system of claim 12, wherein the pixel-by-pixel metadata comprise metadata associated with individual pixels of the image data.

* * * * *